Patented Feb. 17, 1942

2,273,269

UNITED STATES PATENT OFFICE 2,273,269

PREPARATION OF ORGANIC ESTERS

Robert Johnson, Wilmington, Del., assignor to E. I. du Pont de Nemours & Company, Wilmington, Del., a corporation of Delaware No Drawing. Application January 11, 1939, Serial No. 250,334

17 Claims. (Cl. 260—484)

This invention relates to a process for the preparation of organic esters and their corresponding acids and more particularly to the preparation of such compounds by the interaction of methylene glycol ethers with carbon monoxide.

An object of the present invention is to provide an improved process for the preparation of aliphatic, aromatic, cyclic and alicyclic glycolic acid esters and their acids in which the hydrogen of the hydroxyl group has been replaced by a functional group. Another object of the invention is to provide an economical process for the preparation of alkoxy substituted acetic acids and their esters from inexpensive raw materials. Yet another and more specific object of the invention is to provide a process for the preparation of alkoxy acetic acids and their esters, wherein the ester is first prepared by the interaction of a methylene glycol ether with carbon monoxide. A further object of the invention is to provide suitable catalysts for these processes. Other objects and advantages of the invention will hereinafter appear.

The objects, and other advantages of the invention which will hereinafter be more fully appreciated, are realized by the interaction of a symmetrical or unsymmetrical ether of methylene glycol with carbon monoxide, preferably in the presence of a suitable catalyst. The reaction appears to proceed substantially in accord with the following equation:

(1) 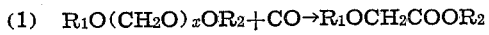
$R_1O(CH_2O)_xOR_2 + CO \rightarrow R_1OCH_2COOR_2$ wherein $R_1$ and $R_2$ designate similar or dissimilar alkyl, aryl, aralkyl, acyl, heterocyclic or alicyclic groups, and $x$ is one or more. The methylene glycol ethers, or as they are sometimes called, formals, designated in Equation 1, may be replaced by cyclic type formals such, for example, as the glycol formals. As is indicated in Equation 1, the absorption of one mole of carbon monoxide results in breaking of one carbon-oxygen bond to give an alkoxy ester. This reaction goes with facility over a wide range of temperatures as will be more fully particularized hereinafter but the introduction of two moles of carbon monoxide to break the carbon-oxygen linkage between each of the alkoxy groups attached to the methylene group to give a dicarboxylic acid ester such as methyl malonate is effected only with difficulty.

The following equation illustrates more specifically the process, with particular reference to the interaction of the dimethyl ether of methylene glycol with carbon monoxide:

(2) 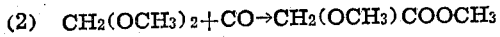
$CH_2(OCH_3)_2 + CO \rightarrow CH_2(OCH_3)COOCH_3$

Thus, from methylene glycol dimethyl ether, methyl methoxy acetate is obtained and, in a similar manner from the diethyl, dibutyl and higher symmetrical ethers of methylene glycol, corresponding ethyl ethoxy, butyl butoxy and homologous substituted acetates, respectively, may be produced. When unsymmetrical methylene glycol ethers are employed, the carbon-oxygen linkage broken to give the ester will be the one more labile under the conditions of the reaction.

Generally, it may be stated that the reaction may be conducted by placing the ether of methylene glycol to be reacted in a suitable reaction vessel, adding an acidic type catalyst, such, for example, as boron trifluoride, closing the vessel and introducing carbon monoxide. Due to the facility with which this reaction goes, no heat need generally be applied to the vessel, but, in many instances, due to the exothermic nature of the reaction, precautions must be taken to prevent the temperature of the reaction from rising to such a degree that excessive decomposition of the reactants or products results.

The reaction may be effected at temperatures ranging from well below room temperature to in the neighborhood of 300° C., the preferred range for the interaction of the methylene glycols of the lower ethers, i. e., the methylene glycols of methyl, ethyl, propyl, and butyl ethers, with carbon monoxide is between 10 and 100° C. Atmospheric pressures may be employed, although, in order to increase the velocity of the reaction and insure the introduction of sufficient carbon monoxide to react with the methylene glycol ether treated, it is recommended that pressures in excess of atmospheric be used. Thus, elevated pressures ranging between 5 atmospheres and 1500 atmospheres are suitable with a preferred range between 30 and 700 atmospheres, said preferred range of pressures being employed with the preferred temperature range hereinbefore designated and the preferred catalyst concentrations hereinafter designated. While specific ranges of temperatures and pressures have been indicated, the reaction may be effected over wide ranges of temperatures and pressures, the optimum conditions varying with the particular methylene glycol ether reacted and the activity and concentration of the catalyst employed.

As may be inferred from the above generic formulas, a large number of methylene glycol derivatives and related compounds may be reacted with carbon monoxide in accord with my invention, and among those included may be specifically named for the purpose of example the following: the dimethyl ether, methyl ethyl ether, diethyl ether, dipropyl ether, diisopropyl ether, dibutyl ether, diisobutyl ether, diinactive amyl ether, diisoamyl ether, dioctyl ether, diallyl ether, dibenzyl ether, diphenyl ethyl ether, and the dibutene ethers of methylene glycol; bis(ethoxy methyl) ether (C₂H₅OCH₂OCH₂OC₂H₅)

and formaldehyde-dibutene acetal,

CH₂(OCH₂CH₂CH:CH₂)₂

In addition the following methylene glycol derivatives may be employed: the glycol formals such, for example, as 1.2 glycol formal,

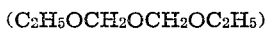

1.3 glycol formal,

decamethylene glycol formal, cyclohexyl formal, CH₂(OC₆H₁₁)₂, the symmetrical and unsymmetrical acyl ethers of methylene glycol such, for example, as methyl acetyl ether of methylene glycol, CH₂(OCH₃)OCOCH₃, diacetal ether of methylene glycol, CH₂(OCOCH₃)₂, ethyl propionyl ether of methylene glycol, CH₂(OC₂H₅)OCOC₂H₅, and homologous acetal ethers of methylene glycol. In the above designated reactants (and particularly the ethers of methylene glycol which may be likewise called symmetrical and unsymmetrical alkyl formals) the hydrogen atoms of the alkyl group may be replaced by one or more functional groups.

It is understood that the above list represents but a few of the large number of methylene glycol derivatives or formals which may be reacted with carbon monoxide in accord with my invention to give glycolic acid esters in which the hydrogen of the hydroxyl group has been substituted.

In order to increase the velocity of the reaction, it is recommended that a catalyst be employed. In general, a catalyst may be used in amounts ranging up to in the order of 1 mole thereof per mole of the ethylene glycol derivative. Acidic substances, generally, that is those which give in an aqueous medium a pH of less than 7, are suitable for catalyzing the reaction. Catalysts which are applicable include, for example, the inorganic acids and more particularly hydrochloric, sulfuric, and phosphoric acids; inorganic acidic salts such, for example, as potassium acid sulfate, sodium acid phosphate, and the non-metal halides such, for example, as boron fluoride, boron chloride, etc. Organic acids and organic acid salts may likewise be employed such, for example, as formic, acetic, glycolic acids and their acid salts.

When boron fluoride is used as the catalyst, it has been found that it may first be combined with the methylene glycol derivative to be reacted and the resulting mixture (which, for the sake of convenience, will be called a complex) reacted with carbon monoxide. It is not necessary that all of the methylene glycol derivative to be reacted with carbon monoxide shall be combined with the boron fluoride, for the reaction proceeds satisfactorily if a methylene glycol derivative-boron fluoride complex is present in the ratio of from 1 to 10 moles thereof per 100 moles of the total methylene glycol derivative. Complexes of boron trifluoride with other compounds such as water, and particularly organic compounds such, for example, as complexes of boron fluoride with dimethyl ether, methanol, methyl methoxy acetate, glycolide and the like, may likewise be employed. As has already been indicated, boron trifluoride may be added directly to the methylene glycol derivative to be reacted and when the process is conducted in this manner 0.5 mole to 1 mole of boron fluoride per mole of the methylene glycol derivative may be employed. Higher proportions may be used, but, generally, those indicated in the designated range cover the more practical ratios. The preferred range for use when the hereinbefore designated preferred temperatures and pressures are employed should be between approximately 25 and 75 moles of boron fluoride per 100 moles of the methylene glycol derivative.

If desired the reaction may be carried out in the presence of an organic or inorganic solvent which is preferably substantially inert with respect to the carbon monoxide and catalyst employed. For this purpose such solvents as benzene, nitrobenzene, liquid sulfur dioxide and liquid carbon dioxide may be used. Organic acids such as acetic, propionic, glycolic, alkoxy glycolic acids and the like may be used both as solvents and reactants, for with their use some substituted products are formed.

The carbon monoxide required for the synthesis may be conveniently derived from various commercial sources as, for example, water gas, producer gas, etc., by liquefaction and other methods and for best results it should be relatively pure. The carbon monoxide should preferably be present in sufficient excess to insure an adequate supply thereof for absorption by the methylene glycol derivative used and to inhibit any appreciable decomposition of the methylene glycol derivative.

The reaction product obtained when methylene glycol dimethyl ether is reacted in accord with my invention consists essentially of methoxy methyl acetate together with the catalyst. The product is separated from the catalyst by fractional distillation in a suitable converter from which the methyl methoxy acetate is removed by distillation, preferably under reduced pressure, it being generally desirable to carry this separation only to partial completion, the residue containing methyl methoxy acetate and boron trifluoride being recycled to the reaction zone for further treatment with carbon monoxide and more methylene glycol dimethyl ether. Generally speaking, this method of recovery may be used also for the recovery of the product obtained when higher methylene glycol derivatives are reacted with carbon monoxide, but, in each instance, care should be exercised in selecting conditions in order that recovery may be effected with the least possible decomposition.

An alternate method of separation involves the displacement of the alkyl alkoxy acetate from its complex with boron trifluoride by the addition of calcium fluoride thereto. Calcium fluoride appears to have a greater affinity for boron trifluoride than do the alkyl alkoxy acetates, and, after the addition of calcium fluoride, the alkyl alkoxy acetate may be readily recovered therefrom by distillation under reduced pressure, leaving as a residue a calcium fluoride-boron fluoride complex from which boron fluoride may be recovered in accord with the process described by R. E. Schultz in U. S. Patent 2,135,458.

The following examples will illustrate methods of practicing the invention, although it will be understood that the invention is not limited to the examples. The parts are by weight unless otherwise indicated.

*Example 1*

67.3 parts (.864 mole) of methylene glycol dimethyl ether (methylal) were mixed with 100 parts of a complex which contained 0.432 mole of boron trifluoride (made by adding boron trifluoride to methyl methoxy acetate) which complex had a boiling point of 52 and 53° C. at 7 mm. pressure. The resulting mixture was placed in a silver-lined autoclave and carbon monoxide introduced until a pressure of 155 atmospheres was attained. External heat was applied to the autoclave until a temperature of 50° C. was reached. During the heating and reaction periods, the autoclave was shaken. After the initial absorption of carbon monoxide, which was indicated by a drop in pressure, more carbon monoxide was added until the total pressure of 700 atmospheres was indicated. The agitation was continued and the temperature maintained at approximately 50° C. until no further absorption of gas occurred. The over-all reaction time was about 26 minutes. Carbon monoxide pressure on the autoclave was reduced to substantially atmospheric pressure, the product discharged and distilled at reduced pressure to give approximately 74.7 parts of methyl methoxy acetate free of boron fluoride. The conversion to ester was substantially 83% of the theoretical. The residue from the reduced pressure distillation was mixed with 76.3 parts of methylene glycol dimethyl ether and the process repeated.

*Example 2*

74.2 parts of ethyl ethoxy acetate, 40.6 parts of boron trifluoride and 125 parts of methylene glycol diethyl ether (diethyl formal) were mixed and placed in a silver-lined autoclave. Carbon monoxide gas was introduced until a pressure of 700 atmospheres was attained, the autoclave shaken at room temperature until the drop in carbon monoxide pressure ceased, indicating that the reaction was substantially completed. The absorption of carbon monoxide required approximately 95 minutes. The excess gas was vented and the product discharged and distilled under reduced pressure. The distillate was washed with a saturated solution of potassium carbonate to remove the last traces of boron trifluoride. The yield of ethyl ethoxy acetate was approximately 80.7%.

*Example 3*

52.8 parts of anhydrous boron trifluoride was added to 160 parts of methylene glycol diisobutyl ether (diisobutyl formal). After placing the mixture in a silver-lined autoclave the pressure in the tube was increased to 530 atmospheres, by the introduction of carbon monoxide gas. The autoclave was shaken at room temperature until the absorption of carbon monoxide appeared to be complete, which required approximately 55 minutes. After venting the excess carbon monoxide, the product was discharged from the tube and washed with aqueous potassium carbonate to remove boron trifluoride. Subsequent distillation of the product under reduced pressure gave a yield of approximately 46.2% of isobutyl isobutoxy acetate.

While the examples have referred particularly to carrying out the process in a more or less discontinuous manner, the process of the invention may likewise be effected in a continuous manner, (as is inferred from Example 1) by passing, for instance, the methylene glycol derivative and catalyst through a reaction zone either co-current or counter-current to the flow of carbon monoxide, the rates of flow being adjusted and coordinated with the pressure, temperature and catalyst employed to yield the desired degree of reaction. Carbon monoxide should be maintained at a suitable pressure as in the processes described in the examples and the temperature of the continuous reaction should be held in the desired range by suitable heating and/or cooling means.

In order to insure adequate and intimate contact between the methylene glycol derivative and the carbon monoxide gas, thorough stirring is an essential if high yields are to be obtained and this is particularly so when conducting the process in an autoclave. No matter what the type of reaction vessel used, intimate contact is of considerable importance to insure optimum yields.

Because of the corrosive nature of the catalyst and reactants, it is desirable to carry out the process, particularly if the reaction is conducted at high temperatures, in vessels lined with silver, chromium, stainless steel and the like, while if the reaction is conducted in the neighborhood of room temperature, glass, silica, porcelain-lined, aluminum-lined, or copper-lined vessels may be employed.

The esters obtained in accord with this process may, simultaneously with or subsequent to the reaction, be hydrolyzed in the presence of a suitable catalyst such as sulfuric acid, hydrochloric acid, boron trifluoride and the like to the corresponding acid. While the hydrolysis may be carried out during the reaction, particularly when a low concentration of catalyst is employed, it is recommended that the hydrolysis step be carried out subsequent thereto, in order that it may be possible to employ conditions most favorable to hydrolysis. If the hydrolysis is carried out concurrently with the reaction, conditions of temperature and pressure are such that a compromise usually results between the optimum conditions for the carbon monoxide reaction and those optimum for the esterification reaction.

In consideration of the above specification, it will be appreciated that many changes may be made in the details therein given without departing from the scope of the invention or sacrificing any of the advantages that may be derived therefrom.

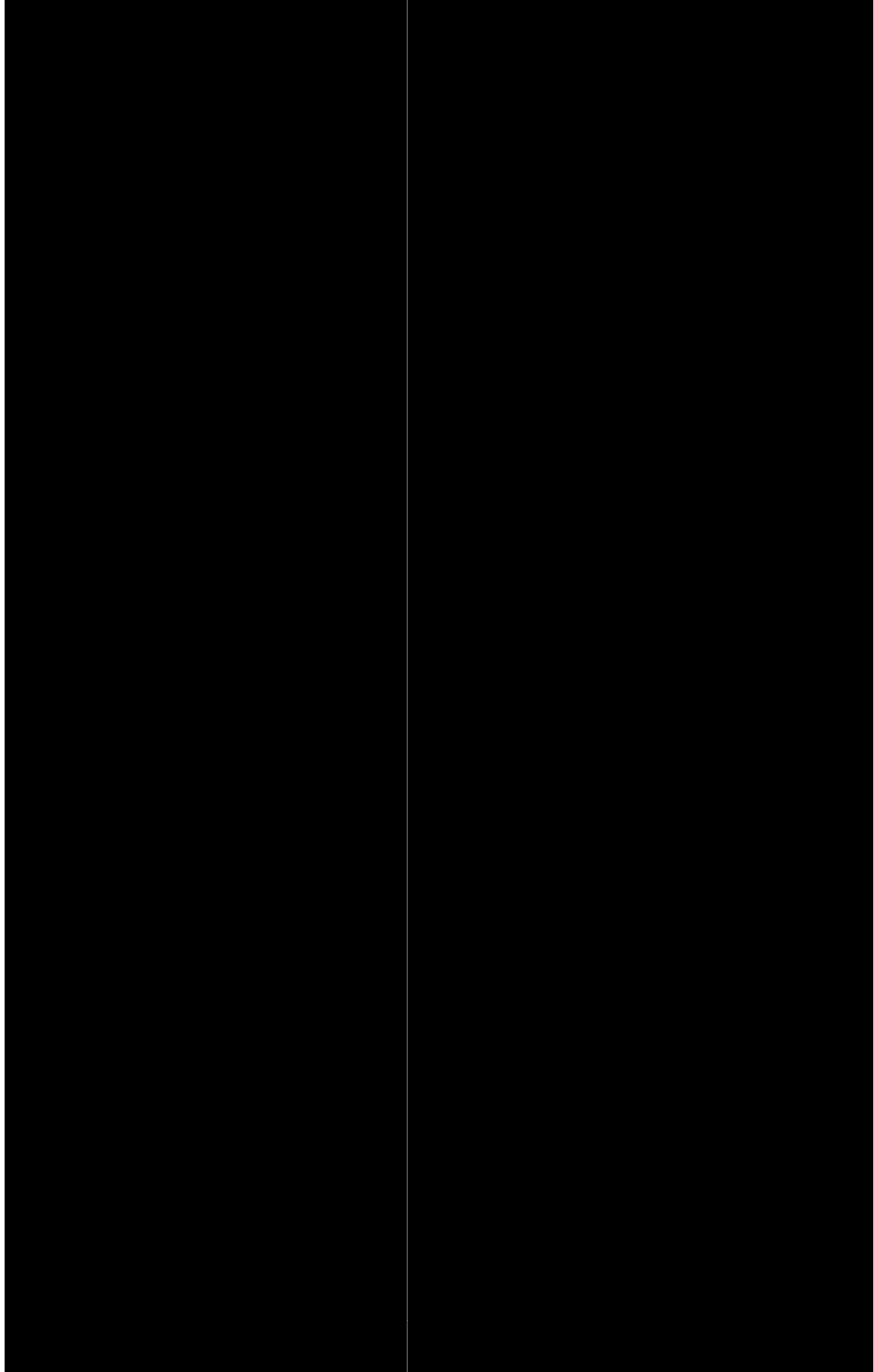

I claim:

1. In a process for the preparation of oxygenated organic compounds the step which comprises reacting a methylene glycol di-ether with carbon monoxide.

2. The process of claim 1 conducted in the presence of an acidic catalyst.

3. The process of claim 1 conducted in the presence of a catalyst which in water gives a pH of less than 7.

4. In a process for the preparation of an oxygenated organic compound the step which comprises effecting a reaction between carbon monoxide and a methylene glycol ether in accord with the equation:

$$R_1O(CH_2O)_xR_2 + CO \rightarrow R_1OCH_2COOR_2$$

wherein $R_1$ and $R_2$ designate functional radicals selected from the group consisting of alkyl, aryl,